United States Patent
de Andrade et al.

(10) Patent No.: US 11,875,140 B2
(45) Date of Patent: *Jan. 16, 2024

(54) APPLICATION SUPPORT FOR NETWORK DEVICES

(71) Applicant: Comcast Cable Communications, LLC, Philadelphia, PA (US)

(72) Inventors: David de Andrade, San Anselmo, CA (US); Michael J. Cook, Flemington, NJ (US); Labeeb K. Ismail, San Francisco, CA (US); Mark A. Vickers, Belmont, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,074

(22) Filed: Jun. 28, 2022

(65) Prior Publication Data

US 2022/0405069 A1    Dec. 22, 2022

Related U.S. Application Data

(63) Continuation of application No. 17/192,374, filed on Mar. 4, 2021, now Pat. No. 11,422,779, which is a continuation of application No. 16/007,739, filed on Jun. 13, 2018, now Pat. No. 10,983,765, which is a continuation of application No. 13/428,425, filed on Mar. 23, 2012, now Pat. No. 10,031,728.

(51) Int. Cl.
*G06F 8/38*     (2018.01)
*H04L 69/08*    (2022.01)
*G06F 9/451*    (2018.01)

(52) U.S. Cl.
CPC ............. *G06F 8/38* (2013.01); *G06F 9/452* (2018.02); *H04L 69/08* (2013.01)

(58) Field of Classification Search
CPC ............. G06F 8/38; G06F 9/452; H04L 69/08
See application file for complete search history.

(56) References Cited

U.S. PATENT DOCUMENTS 8,112,768 B2 *  2/2012  Wu ................... G06F 16/9535
                                                       709/242
2004/0025190 A1  2/2004  McCalla et al.
(Continued)

OTHER PUBLICATIONS

Ignitesol.com, dated Nov. 13, 2010. http://web.archive.org/web/20101113160559/http://www.ignitesol.com/, retrieved Mar. 31, 2014.
(Continued)

*Primary Examiner* — Tadesse Hailu
*Assistant Examiner* — Darrin Hope
(74) *Attorney, Agent, or Firm* — Banner & Witcoff, Ltd.

(57) ABSTRACT

A system may receive application data in a client-incompatible format and convert at least a portion of the application data into an alternate client-compatible format. In one example, the incompatible format may comprise Enhanced Binary Interchange Format (EBIF) while a client-compatible format may include a web format such as JavaScript, XML or HTML. Interactions (e.g., commands and user input) associated with the application may be received and converted. The interactions may then be processed using the application.

20 Claims, 18 Drawing Sheets

(56) References Cited

U.S. PATENT DOCUMENTS

| | | |
|---|---|---|
| 2006/0130120 A1 | 6/2006 | Brandyberry et al. |
| 2008/0250044 A1 | 10/2008 | Adams |
| 2010/0077058 A1 | 3/2010 | Messer |
| 2010/0268941 A1 | 10/2010 | Pahlavan et al. |
| 2011/0083069 A1 | 4/2011 | Paul et al. |
| 2012/0084825 A1 | 4/2012 | Sharma et al. |
| 2012/0096503 A1 | 4/2012 | Slothouber et al. |
| 2013/0111515 A1 | 5/2013 | Mehta et al. |

OTHER PUBLICATIONS

EBIF 1.0 Specification, 104, Cable Television Laboratories, Inc. (Sep. 21, 2007).
Jan. 30, 2019—Canadian Office Action—2,809,671.
Jan. 19, 2021—Canadian Office Action—CA 2,809,671.

\* cited by examiner

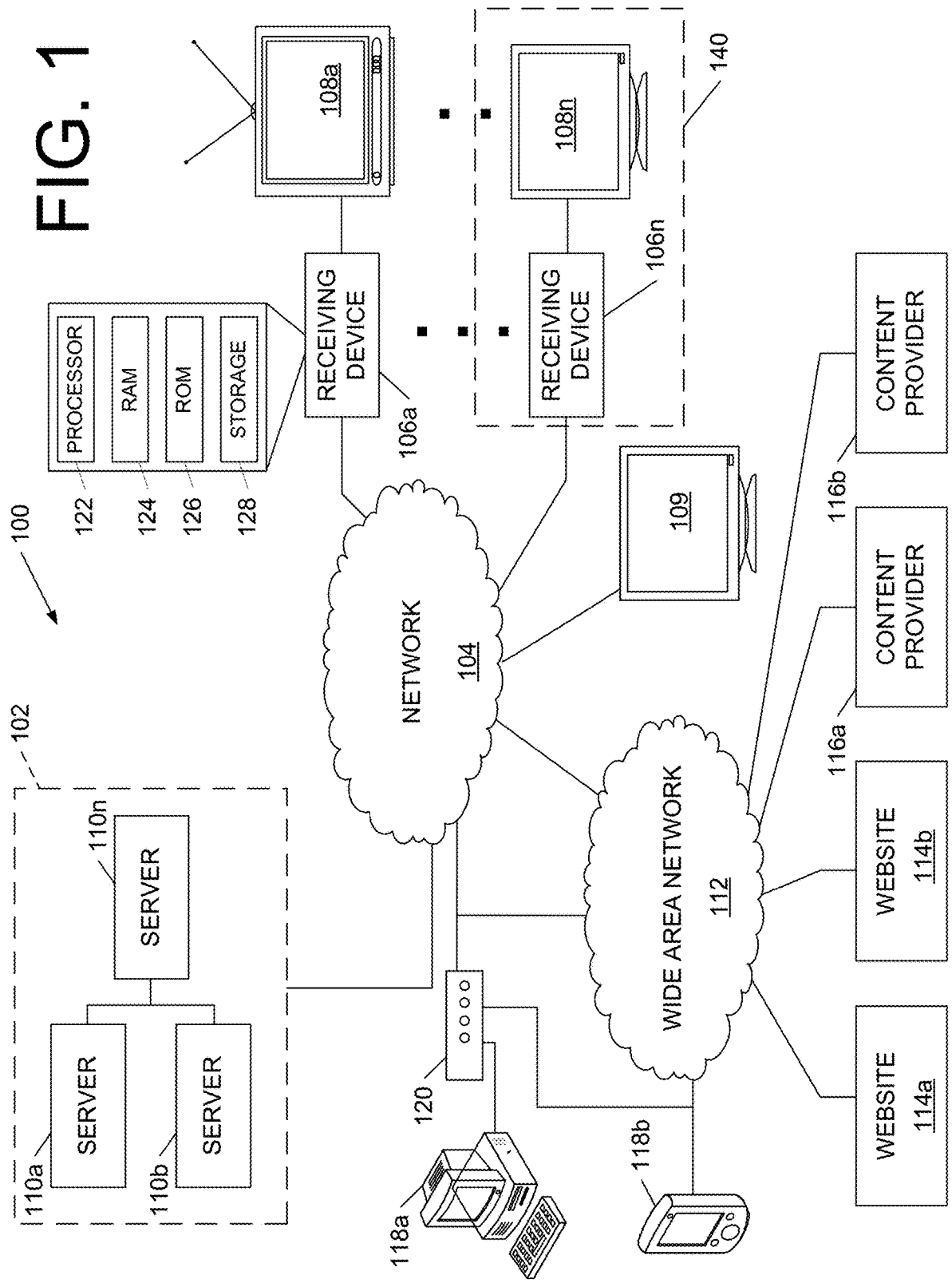

DID YOU KNOW?

This movie was supposed to begin filming in 1985, but due to a fire in Restaurant YYY, the site of a critical scene, filming was delayed for several years. 215

210

213

MOVIE QUIZ:
In what year was the above movie filmed?

A: 1992
B: 2003
C: 1990

211

Current Weather for Zip Code 20005

Cloudy
80 °F update

"Graphics Message":{
  "STBID":"10.13.12.1",
  "Transaction ID":"1",
  "Type":["html" or "resource"]
  "Command":["view" or "put/tm" or "add" or "delete" for resource]
  "Payload":{
    "Name":"image.jpg"
    "Data":"XXX"
  }
}

FIG. 10A

"Key Event":{
  "STBID":"10.13.12.1",
  "Transaction ID":"1",
  "Payload":"XXX"
}

FIG. 10B

"Focus Message":{
  "STBID":"10.13.12.1",
  "Transaction ID":"1",
  "Command":"applicationRequestFocus"
  "Payload":{
    "Granted":"null"/"True"/"false"
  }
}

FIG. 10C

```
"GuideMessage": {
    "STBID": "10.13.12.1",
    "TransactionID": "1",
    "Command": "getMediaLocator",
    "Payload": {
        "Type": "VCN" | "CallLetters" | "NetworkID"
        "Data": "XXXX",
        "MediaLocator": "XXXX"
```

WEB BROWSER

Address: http://www.zzzzzz.com/etvconfig.html

ENHANCED TV CONFIGURATION SETTINGS — 1100

| CHANNEL | 8-9 PM | 9-10 PM | 10-11 PM |
|---|---|---|---|
| 5 ☐ | NEWS ☐ | COMEDY SHOW ☐ | COMEDY SHOW ☐ |
| 6 ☐ | SPORTS | SPORTS | NEWS ☒ |
| 7 ☐ | MOVIE 1 ☐ | MOVIE 1 ☐ | COMEDY ☐ |
| 8 ☐ | MOVIE 2 ☒ | MOVIE 2 ☒ | COMEDY ☐ |
| 9 ☐ | SPORTS | SPORTS | MOVIE 3 ☐ |
| 10 ☒ | NEWS ☒ | MOVIE 3 ☒ | MOVIE 3 ☒ |

1103, 1107

☐ SELECT ALL — 1119
☐ SELECT ALL — 1105

[ cancel ]  [ clear ]  [ apply ] — 1101

APPLICATION VIEWING DEVICE — 1109

○ TELEVISION — 1111
● OTHER DEVICE — 1113
○ OTHER DEVICE & TELEVISION — 1115

| Device 1 |
| Device 2 |
| Device 3 | 1117

[ refresh ]  [ select ]

APPLICATION SUPPORT FOR NETWORK DEVICES

CROSS REFERENCE TO RELATED APPLICATION

This application is a continuation of U.S. patent application Ser. No. 17/192,374, filed Mar. 4, 2021, which is a continuation of U.S. patent application Ser. No. 16/007,739 filed on Jun. 13, 2018, now U.S. Pat. No. 10,983,765, which is a continuation of U.S. patent application Ser. No. 13/428,425, filed on Mar. 23, 2012, now U.S. Pat. No. 10,031,728, each of which is hereby incorporated herein by reference in its entirety.

BACKGROUND

Enhanced television (ETV) applications provide added interactivity and functionality for content such as television content, on-demand content and the like. ETV applications may conform to the Enhanced Binary Interchange Format (EBIF) specification for deployment of interactive applications. The EBIF specification condenses interactive television applications to use minimum resources. Enhanced application content encoded in one format, such as EBIF, may be transmitted over an MPEG 2 stream to format-compatible receiving devices such as EBIF-compatible display devices including televisions and other types of displays. Such EBIF-compatible devices generally include a user agent which is able to interpret the EBIF data and execute the ETV application.

However, currently, EBIF applications are supported only on particular devices and systems, limiting the interactive applications' reach to more devices and users.

BRIEF SUMMARY

The following presents a simplified summary of the disclosure in order to provide a basic understanding of some aspects. It is not intended to identify key or critical elements of the disclosure or to delineate the scope thereof. It merely presents some concepts in a simplified form as a prelude to the more detailed description provided below.

Aspects of the disclosure relate to the use of an EBIF compatible system or device (e.g., a remote user agent) as an intermediary for processing of enhanced applications such as ETV applications. For example, a service provider transmitting ETV applications in EBIF data format may transmit the application data to an EBIF compatible device. The EBIF compatible device may then send ETV application or an output thereof in a web services format such as XML or HTML to a web-enabled device (e.g., a computing device, smart phone, display device, personal data assistant (PDA), cell phone, etc.). Accordingly, web-enabled devices, regardless of compatibility with EBIF specification, may receive and execute ETV applications. User interaction or input with the application may be received by the EBIF compatible device, converted to EBIF format and injected into the EBIF application for execution.

According to another aspect, an EBIF compatible system may retrieve XML or HTML data for an ETV application corresponding to EBIF data received from a provider or a database. For example, upon receiving EBIF data for an ETV application from a provider, an EBIF compatible system may identify the ETV application from EBIF headers and parameters. Subsequently, the EBIF compatible system may retrieve the ETV application in web format from a database using the identification information. The retrieved web format ETV application data may then be sent to a web enabled device.

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 1 illustrates an example network environment in which content items may be distributed to users.

FIG. 2B illustrates another example enhanced television application on a display device.

FIGS. 10A-10G illustrate example functions that may be used to generate messages between a user agent and a client-compatible server.

FIG. 11 illustrates an example interface through which application configurations may be defined.

DETAILED DESCRIPTION

Figure 2A:
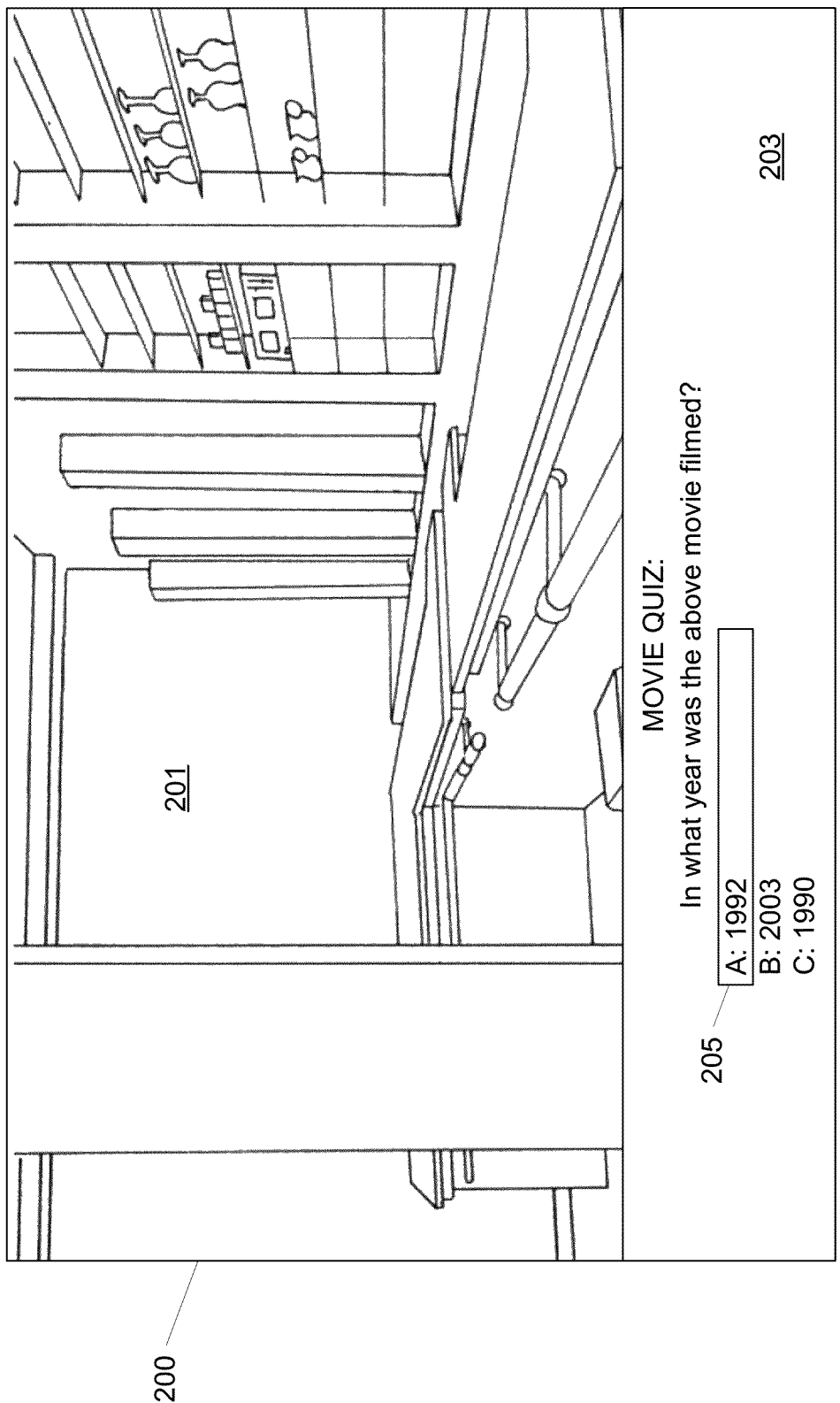
FIG. 2A illustrates an example enhanced television application on a display device.

FIG. 1 illustrates a content access and/or distribution system 100 that may be used in connection with one or more aspects described herein. Content may include data, video, audio, text, documents, images and the like and/or combinations thereof. The system 100 may include a content server 102, a network 104, receiving devices 106 and 109 and content consumption devices 108a-108n. Receiving devices 106, 109 and consumption devices 108 may comprise a single device 140. While content consumption devices 108a-108n are illustrated as being connected to a receiving device 106, in some examples, one or more of content consumption devices 108a-108n may be configured to receive content from the content network without use of a supplemental receiving device such as receiving devices 106. The system 100 may, in some examples, correspond to a content provider system wherein the provider may operate the content server 102 and the network 104 and may also provide a viewer (e.g., client, customer, service purchaser, user, etc.) with a receiving device such as a set top box (STB). In other examples, the receiving device may be owned by the user.

Receiving devices may include display devices, mobile devices, computers, set-top boxes, digital video recording devices and the like and/or combinations thereof. Computing devices such as receiving devices 106, 108 and display 109 may include various components such as a processor 122, random access memory (RAM) 124, read-only memory (ROM) 126 and storage 128. Processor 122 may be used to perform calculations and execute instructions such as those stored in RAM and ROM 126. Data may further be stored in storage 128 and retrieved depending on need.

Content consumption devices such as devices 108 may include a television, high definition television (HDTV), monitor, host viewing device, MP3 player, audio receiver, radio, communication device, personal computer, smart phones and other mobile devices, media player, digital video recorder, game playing device, etc. The device 108 may be implemented as a transceiver having interactive capability in connection with a supplemental receiving device 106, the content server 102 or both. The content server 102 may include a plurality of devices 110 (e.g., devices 110a-110n) such as data servers, computers, processors, security encryption and decryption apparatuses or systems, and the like.

In one or more embodiments, network 104 may further provide devices 106, 109 and 118 with data access to a wide area network (WAN) 112 such as the Internet. In one example, a service provider may allow a user to access websites (or local network sites) 114a and 114b and content providers or sources 116a and 116b connected to the Internet (e.g., WAN 112) using the device 106. In another example, a service provider (e.g., a media provider) may supplement or customize media data sent to a user's receiving device 106 using data from the WAN 112. To access the WAN using computing devices 118 (rather than receiving device 106), a user may be provided with a network access device such as a modem 120 that is configured to process data. For example, in one type of network, data may be carried through radio frequency (RF) channels on the network infrastructure into IP data packets.

According to one or more arrangements, a computing device such as content server 102 may be configured to provide interactive applications such as enhanced television (ETV) applications that provide additional functionality and interactivity in association with content transmissions, such as television transmissions. For example, enhanced television applications may include one or more interactive multimedia pages that are displayed in conjunction with television content. The multimedia pages of the application may include one or more widgets. Widgets, as used herein, generally refer to applets that may be executed within the context of another program or application executing on a device such as a computing device. Types of widgets defined within the application context may include buttons, forms, containers, timers, videos and the like. Multimedia pages and widgets included therein may be displayed within the context of television content, providing various interactive features associated with the transmitted programming.

A multimedia page of an interactive application (e.g., ETV application) may be used to define the appearance of content relative to interactive features. The multimedia page may specify the locations of each component relative to one another or in absolute terms. For example, the multimedia page of an application may specify that a weather widget is to be placed in the upper left hand corner of a display while a quiz widget is to be displayed in the lower left hand corner.

Alternatively, an application might not define the locations of application or page components and transmitted programming. Instead, the placement of the application and programming content may adhere to a default arrangement or to user preference or both (e.g., if only certain locations are defined). For example, the application may overlay the programming by default. In another example, the application may be displayed next to programming (i.e., the display may be divided into two sections). In still other arrangements, an application may be delivered to a device separate from a device displaying the other content. For example, an ETV application may be provided to a laptop computer while the other content is delivered to a viewer's television.

FIG. 2A illustrates an example enhanced television application that is displayed on a television or other display device along with transmitted content. Display 200 includes two sections, one occupied by the presentation of video content 201 and the other populated by an interactive application 203, such as a movie quiz. Application 203 may be inserted into the display as an overlay on top of video content 201. That is, a portion (not shown) of video content 201 may be hidden by application 203. Alternatively, video content 201 may be resized such that it fits within the region above application 203 so that portions of the video are not hidden by application 203. Application 203, in this example, includes an interactive quiz feature that allows a user to select an answer from multiple choices. For example, a user may operate a remote control to move focus bar 205 to a desired answer. The user may then select the answer by activating a specified key on the remote control, thereby sending a signal to the device generating the application 203 and display 200. The division of display 200 in FIG. 2A may be defined by a default specified by the display generating device or by the user. That is, the application 203 might not specify placement of the application 203 relative to the programming content 201.

FIG. 2B illustrates another example display 210 which is configured according to a layout specified by an interactive application. For example, the application data may define where certain information such as trivia fact 215, movie quiz 211 and weather widget 221 are located relative to one another on display 210. Additionally, the application may define a portion of display 210 where video content 213 is shown. Video content 213 may be reduced in size to fit within the boundary of the portion defined for its display. A user focus may be defined by focus box 217 that highlights the current widget or portion of the application on which the user is focused. As illustrated, focus is currently on weather widget 221. Weather widget 221, in addition to displaying weather information, may allow the user to manually request updates to the weather data using option 219. Accordingly, the user may select option 219 when the focus is on weather widget 221 to activate the update functionality.

Code for defining enhanced television applications may be formatted according to Enhanced Television (TV) Binary Interchange Format (EBIF). An EBIF resource file, e.g., a sequence of bytes that conforms to the EBIF content format, stores the information for defining an application and is transmitted to a receiving device (e.g., devices 106 or 109 of FIG. 1). Accordingly, a receiving device such as device 106 may include a user agent (e.g., an ETV or EBIF user agent) configured to acquire, decode, present information and execute instructions stored in the EBIF resource file. Although some devices such as device 106 have the ability to appropriately process and execute interactive application data (e.g., EBIF and ETV), other devices including web and IP enabled devices such as computing devices 118 and/or device 109 might not have similar abilities. Thus, pursuant to this disclosure, an interactive application (e.g., EBIF format) compatible system may be configured to act as an intermediary and/or translator for facilitating interaction with applications to non-compatible user devices in a compatible format like Extensible Markup Language (XML) or Hypertext Markup Language (HTML).

In some arrangements, a user agent device may operate as an intermediary between devices not compatible with an application format (e.g., EBIF) and a content server providing applications in that format. The user agent device may execute the application and provide application output such as graphical interface elements to the non-compatible client device. For example, a visual interface of an EBIF application may be generated using JAVA, HTML, XML or other web-compatible code for display at a web-compatible client device. Elements in the visual interface including buttons, menus, and other interactive portions may also be generated in the similar manner. In some examples, a user agent device and a web-compatible client or user device may be included in or correspond to a same device.

In an example, the underlying application functions and executable code might not be translated into a client compatible format such as a non-EBIF format. The client-compatible graphical interface may then be downloaded to the client for viewing and interaction. Users may then interact with the application by interacting with the client compatible graphical interface. The user agent may detect the interactions with the interface elements (e.g., through HTTP or Java event messages) and determine a corresponding EBIF application function or process to invoke based on the type of interface elements, position of the interface element and the like with which the user interacted. Such a system may reduce the amount of EBIF conversion processing necessary for providing EBIF application accessibility to web-compatible devices.

In some examples, EBIF data defining an ETV application may be transmitted from a content server to a user agent by multiplexing the ETV application data in an MPEG-2 Transport Stream along with multimedia content at a content server. The user agent may be configured to, upon receipt of the EBIF application data, convert the data or application output of the application execution into a client compatible format such as XML. The conversion of EBIF to XML may be performed, for example, based on an XML schema defined in Annex J of EBIF 1.0 specification available at http://www.opencable.com/downloads/specs/OC-SP-ETV-BIF1.0-104-070921.pdf. The XML schema defined in the EBIF specification provides a system of representing EBIF resources and data in XML. EBIF resources or triggers represented as XML may be referred to as EBIFX documents. Specifically, the EBIFX schema may include a top level driver schema file (e.g., ebifx.xsd) that includes, for example, six module files for defining primitives, references, tables, widgets, structures and actions. Other methods and systems for converting EBIF to an XML structure is described in U.S. patent application Ser. No. 11/381,508, entitled "VERIFICATION OF SEMANTIC CONSTRAINTS IN MULTIMEDIA DATA AND IN ITS ANNOUNCEMENT, SIGNALING AND INTERCHANGE," filed on May 3, 2006 and having publication no. 2008/0250044. Additional aspects of a format conversion process are described in further detail herein.

Figure 3:
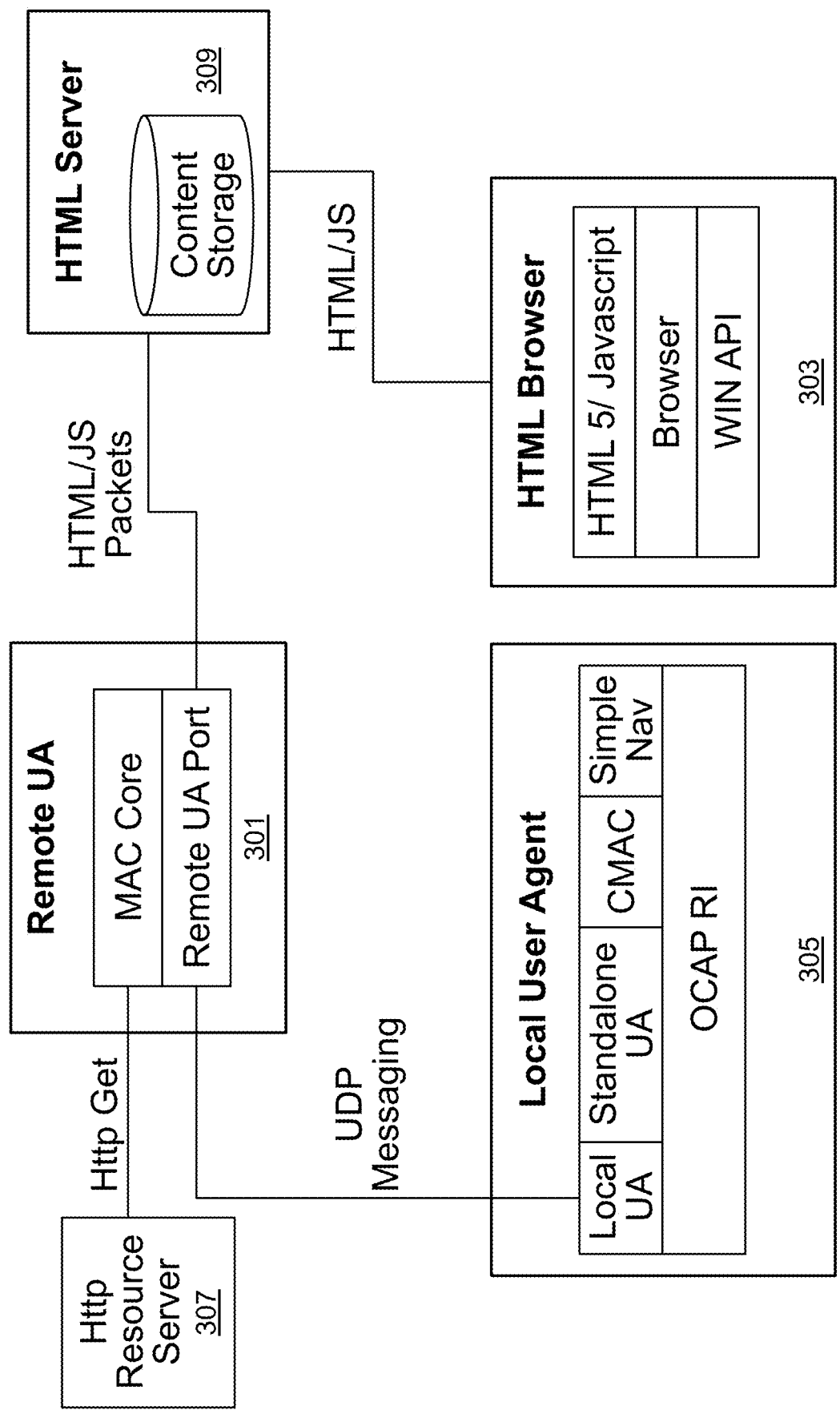
FIG. 3 illustrates an example system architecture through which a user agent may facilitate delivery of content to a user.

FIG. 3 illustrates an example architecture in which a user agent 301 remote to a web-compatible client device 303 may be used to generate web-based content for consumption by the web-compatible client device 303. User agent 301 may be configured to process EBIF content into other formats that are not web-based as well. Local user agent device 305 may represent a set-top box or other EBIF-compatible content receiving device such as an STB or another computing device. In one or more examples, user agent functionality or duties for processing EBIF applications for a non-EBIF compatible device may be split between the remote user agent 301 and local user agent device 305. In one or more examples, the local user agent device 305 may be configured to process signaling and stream events received through the content delivery network. Processing the stream events may include reading (e.g., extracting) ETV Integrated Signal Stream (EISS) signals from the stream events. EISS signals may include identification of new data and/or applications that are or will be available through the content servers and network. Accordingly, the local user agent device 305 may determine whether an EBIF application has been signaled. Signaling of an application may specify that an application is or will be available through the content network and servers. Accordingly, the local user agent device 305 may notify the remote user agent device 301 when an application is signaled. Alternatively or additionally, because local user agent device 305 may be EBIF-compatible, local user agent device 305 may consume the EBIF application for display through an integrated or connected display device.

In the above example, the remote user agent device 301, upon determining that an EBIF application has been signaled, may determine whether the application is currently available as is described in further detail below. The remote user agent device 301 may further be configured to execute the application upon request and to provide application output (e.g., displays, interfaces with interactive items such as buttons and menus) to one or more client devices such as device 303 through a presentation or web server such as server 309. In one example, remote user agent 301 may retrieve HTML or other client-compatible code (e.g., buttons, tables, widgets, JavaScript, etc.) from a resource server 307 to construct an interface corresponding to an EBIF application interface. In other examples, the client-compatible code may be stored in the remote user agent device 301 or another server or database. The remote user agent device 301 may be configured to perform the processes of the local user agent device 305 as well. Accordingly, in some arrangements, the local user agent device 305 might not be necessary.

Once the appropriate interface or interfaces are retrieved or constructed, the interface may be stored in a presentation server such as server 309 for retrieval and delivery to client 303. Accordingly, HTML server 309 may act as a proxy for user interface commands from the remote user agent 301 to client device 303. In a particular example, HTML server 309 may correspond to a guide server that controls the display of the client device by setting and releasing focus, defining display arrangements and features and the like. Remote user agent device 301 may further be configured to process user interactions with the application as is further described below. Accordingly, using the above-noted system, a user may interact with an application provided in a non-compatible format by interacting with user interfaces and elements thereof that are provided in compatible format by a remote user agent device 301.

Figure 4:
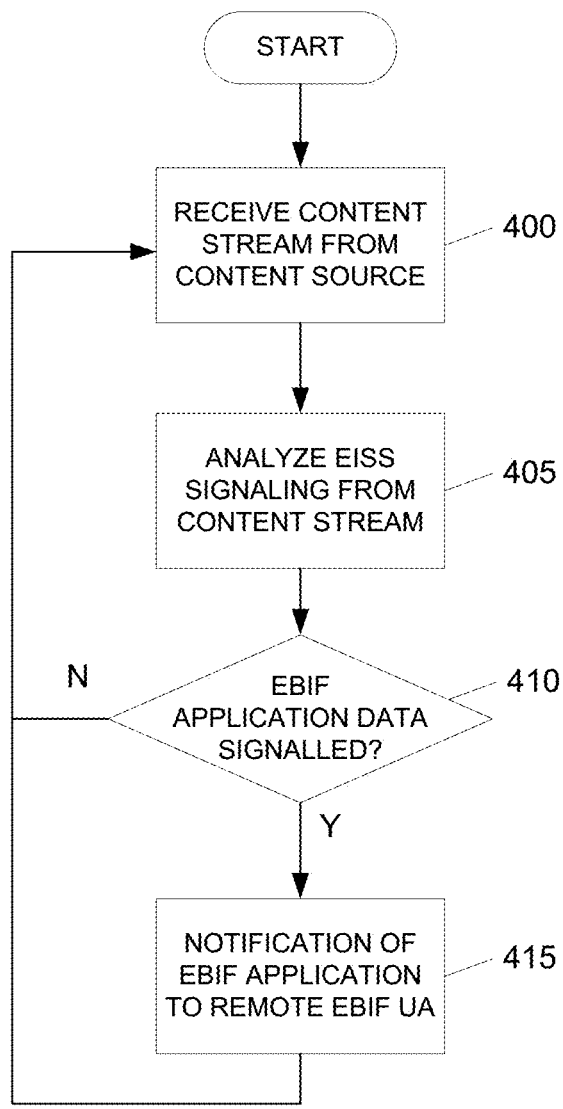
FIG. 4 is a flowchart illustrating an example method for notifying a device of an interactive application.

FIG. 4 is a flowchart illustrating an example process for notifying a remote user agent of a signaled application. In step 400, a computing device compatible with messaging formats and protocols of the content delivery network may receive an information stream from one or more content servers. In one example, the computing device may correspond to a device that is local to a viewer's location or otherwise specific to the viewer, such as a receiving device. The information stream may be encapsulated according to MPEG-2 Transport Stream (TS) protocol. In another arrangement, the information stream may have other formats as appropriate to the receiving device, such as XML timed text tracks, HTML5 TextTrackCues that may be delivered in media containers with in-band or out-of-band messaging. Other messaging formats and/or a mix of messaging formats may be used as appropriate or desired. In step 405, the computing device may parse the information stream and analyze signaling and data included therein. In one example, the information may include an ETV integrated signaling stream (EISS), which may, in turn, identify applications that are available or will be available through the content servers and network. The EISS may include a content hash (e.g., for determining whether a content item has changed), an application instance identifier, an organization identifier (e.g., an organization providing or otherwise associated with the application, an application identifier and an application location identifier such as a uniform resource identifier (URI). The application identifier may uniquely identify the application amongst multiple different applications while the application instance_identifier may uniquely identify a particular execution or copy of the application amongst all copies or executions of that same application. Application instance identifiers may be used to more particularly target users or viewers with data updates, responses to user interactions and the like.

In step 410, the computing device may determine whether an application is signaled in the information stream. For example, the computing device may parse or demultiplex a content stream to identify the contents therein. An application may be signaled by a specified identifier. If an application has been signaled, the computing device may transmit a notification to another computing device such as the remote user agent device in step 415. The notification may include application information including the content hash, the application identifier, the organization identifier, the location identifier (e.g., URI) and/or the application instance identifier. The process may then return to step 400 to wait for and process further information streams received through the content delivery network. In some instances, the further information streams may include updates to the application or new information to be delivered to the user through the application.

Figure 5:
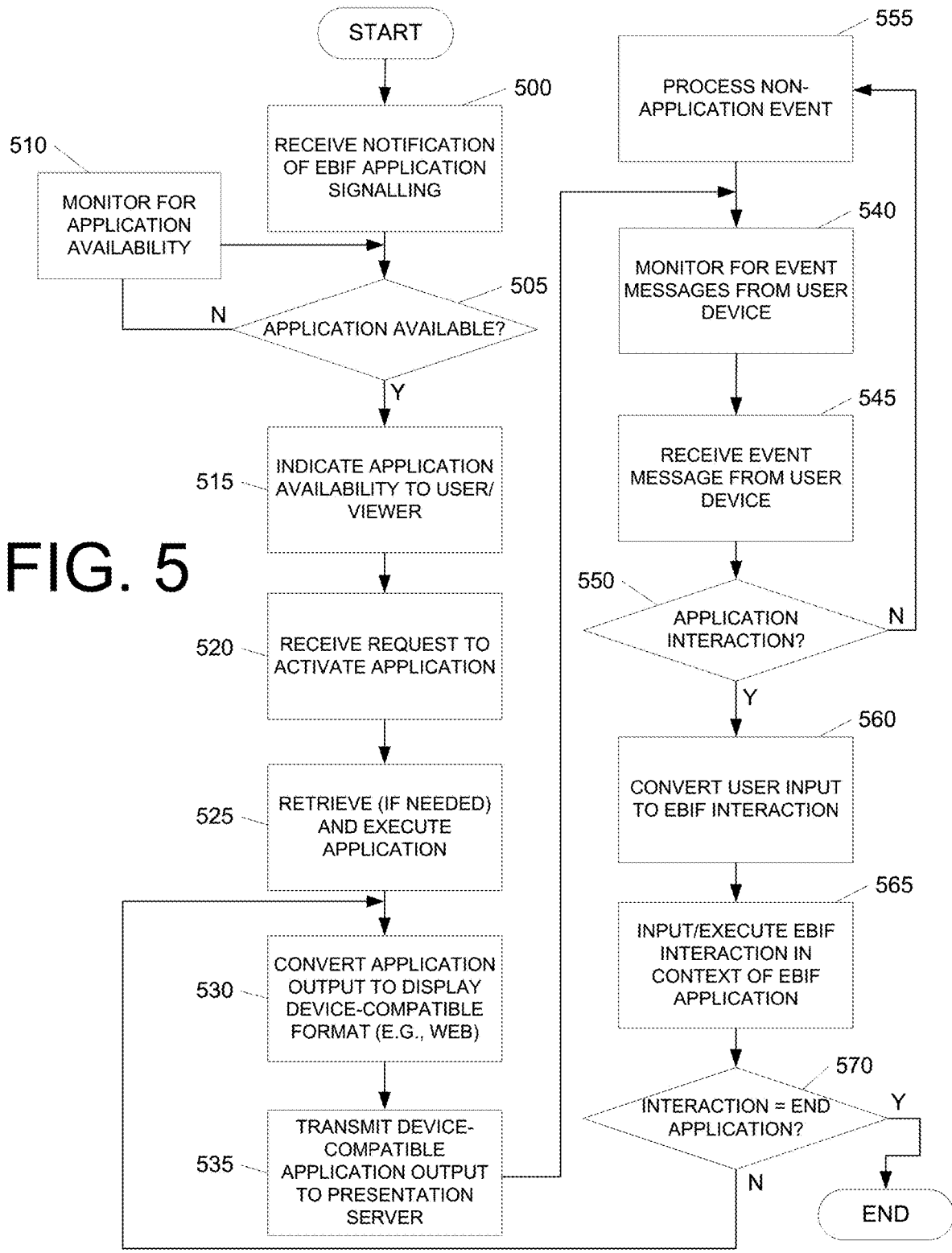
FIG. 5 is a flowchart illustrating an example method for facilitating interaction with an application.

Once the notification has been sent to the remote user agent device, the remote user agent may notify the user of the application's existence and facilitate user interaction with the application. In some examples, the remote user agent device may be local to or integrated with the user's device. FIG. 5 is a flowchart illustrating an example process by which a computing device such as the remote user agent may perform such functions. In step 500, for example, the remote user agent or other computing device may receive a notification from a local user agent that an application has been signaled in an information stream. In step 505, the remote user agent may subsequently determine whether the application is available. Application availability may depend on whether the application is available for retrieval and execution. In some instances, an application may be signaled; however, the application content (e.g., code) might not yet be posted or available to a content server (or another computing device) at the indicated URI or other location identifier. Accordingly, in step 505, the remote user agent may extract the URI from the notification and determine whether the application is available at the indicated location on the network. For example, if the remote user agent attempts to retrieve the application data at the indicated location and receives an error or other notification that the application is not available, the remote user agent may determine that the application is not available. Accordingly, if the application is not yet available, the remote user agent may continue to monitor for application availability in step 510.

If, however, the remote user agent is able to retrieve the application data or otherwise determines that the application data is retrievable at the specified location, the remote user agent may generate and transmit an indication of application availability to the user in step 515. The indication may include a user icon, modifying a visual appearance of currently displayed content, textual messages, audio messages, video messages and the like and/or combinations thereof. In one example, the remote user agent may negotiate display real estate with a guide server configured to control display of information on a user's viewing device. In step 520, the remote user agent may receive a request from the viewer to activate the application (e.g., in response to the application availability indication). Upon receiving the request, the remote user agent may execute the application in step 525. In some instances, if the application has not already been retrieved (e.g., in step 505), the remote user agent may first retrieve the application in response to the request. As discussed herein, the application, as executed, may be in a format that is not compatible with the client device being used by the viewer.

Execution of the application may result in user interfaces being generated and outputted in a first format according to the application code. Once the application output has been generated, the remote user agent may convert the application output to a user device compatible with a second format such as HTML, XML, JavaScript and the like in step 530. Conversion of the application output may include mapping EBIF output code to predefined corresponding JAVA or HTML modules. For example, the remote user agent may store a mapping between EBIF code modules and JAVA or HTML display modules and code segments (e.g., button modules, menu modules, HEADER tags, BODY tags, table modules, etc.). Accordingly, the remote user agent may retrieve the appropriate interface modules in the second format based on the EBIF code modules included in the application output of the first format. In a particular example, if an application output includes an interface with a 5×5 table of information, the remote user agent may identify the information as a table based on keywords or key tags of the application output code. Accordingly, the remote user agent may retrieve code for an interface equivalent in HTML or JavaScript or other client-compatible format. Information in the 5×5 table may then be entered into the HTML or JavaScript code module to generate an HTML or JavaScript equivalent of the EBIF table.

Additionally or alternatively, interactive elements such as buttons, drop down menus, text fields, radio selectors, slider bars and the like may similarly be identified in code of a first format and converted into code of a client compatible second format. The actions associated with the interactive elements, however, may be defined such that the information or input (e.g., button down, slider movement, text entry) may be posted to the remote user agent for processing, as described in further detail below. A user interface such as a webpage or JavaScript interface may thus be generated based on a mapping of modules or code segments in a first format to corresponding modules and code segments in a second client compatible format.

Once the application output in the client compatible format has been generated, the output may be transmitted to a presentation server in step 535. The presentation server may, in one or more arrangements, correspond to a guide server configured to control the layout and focus of display elements within a viewer's display. Accordingly, the presentation server may place focus on various user interface elements or create pop-ups in the interface in conjunction with or independently of the user's control and input. For example, the presentation server may instruct the viewer's interface to display the application output in a particular area or location and/or to provide the application output focus. Focus may, in some instances, refer to input focus, where user input is automatically directed to an application, interface or portion of an interface such as a window or interface element, having input focus. In one or more examples, the remote user agent may provide instructions to the presentation server to control the focus and layout of the display elements.

In step 540, the remote user agent may enter a monitoring mode, in which the user agent monitors for user events from the client device. A user event may include a key or input event such as a key being pressed, scrolling action of a scroll wheel, mouse clicks, contact with a touchpad and the like. The remote user agent may receive notifications of a key event from the web server hosting the application output through an HTTP POST message and may subsequently receive, in step 545, an event message from the client device.

Upon receipt of the event message, the user agent may determine whether the event message corresponds to interaction or a user event for the application in step 550. If not, the non-application event may be processed independently of the application in step 555. If the user event does correspond to interaction with the application, the remote user agent may convert the event into an EBIF interaction or functionality in step 560. In one example, the remote user agent may identify a corresponding EBIF functionality based on type of input, location of input and the like. For example, the remote user agent may determine a corresponding EBIF function or interaction by comparing the location of the key or user event (e.g., a mouse click, a type of mouse click, a key pressed) and comparing the location to known locations of interactive elements in the application output. The interactive elements may then be used to identify the appropriate function or response with in the EBIF application. In another example, the EBIF application may define one or more actions that are to be executed in response to certain triggers or types of input for an application output. Accordingly, the remote user agent may determine whether the detected type of key event satisfies one or more of those triggers and identify an appropriate EBIF function or interaction based on the trigger definition.

Once a corresponding EBIF application function has been identified, the remote user agent may proceed, in step 565, to input the EBIF interaction into the application for processing. Processing of the event and interaction may include transmitting data to an application host server, returning data to the client device, modifying the user interface, executing a script, and/or combinations thereof. The remote user agent may further determine, in step 570, whether the interaction corresponds to a user instruction to end the application or other type of user interaction that ends the application execution. If so, the process may end. If, on the other hand, the interaction does not end the application, the process may then return to step 530 where new application output (e.g., produced in response to the interaction) may be converted into a client-compatible interface. Additionally or alternatively, the application may be terminated. Termination of the application may include removing the application from a processing queue and/or deleting application data from one or more storage devices of the remote user agent. In some instances, the notification of termination may originate from the client device and may be received by the remote user agent through the web server. For example, if the user selects a cancel or close option in the application interface, the corresponding command may be transmitted to the remote user agent for processing. In such cases, a notification might not be sent to the client device since the client device originated the termination.

Figure 6:
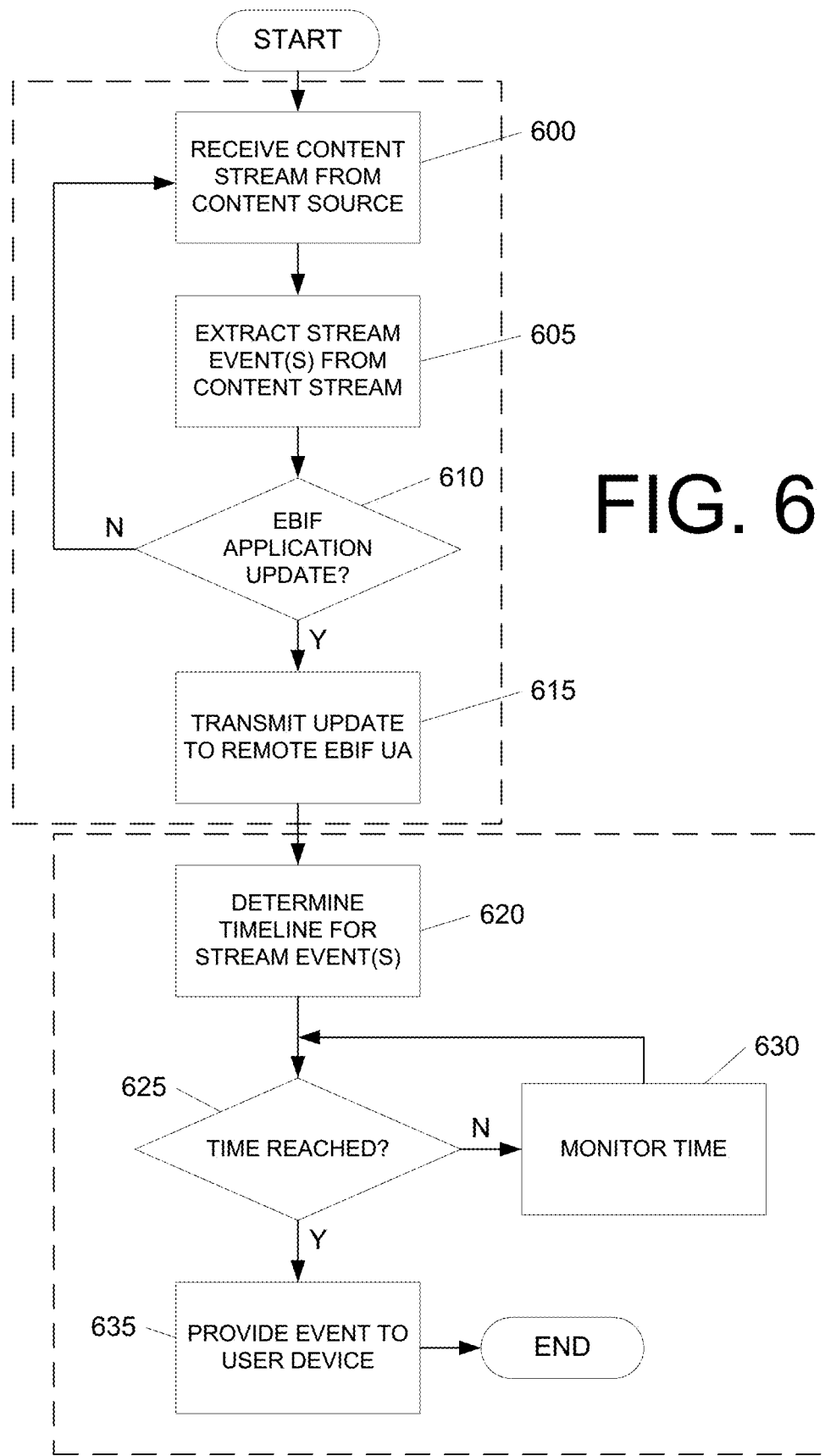
FIG. 6 is a flowchart illustrating an example method of monitoring for and processing application events.

FIG. 6 illustrates an example process for updating application data once an application has been initiated. In one arrangement, steps 600-615 may be performed by a local user agent while steps 620-635 may be performed by a remote user agent. In some examples, steps 600-615 may be performed by the remote user agent while steps 620-635 are performed by the local user agent. As discussed, a local user agent may correspond to a device that is local to a viewer's location or otherwise specific to the viewer, such as a receiving device. A remote user agent may be located remotely from the viewer's location and may be configured to serve multiple viewers or locations. In step 600, the local user agent may receive a content stream from a content server or provider. In step 605, the local user agent may extract stream events from the content stream by demultiplexing the content stream and extracting the ETV application sub-streams. In another arrangement, the stream events may have other formats as appropriate to the receiving device, such as XML timed text tracks, HTML5 TextTrackCues that may be delivered in media containers with in-band or out-of-band messaging. In step 610, the local user agent may determine whether the stream events correspond to updates to the application. For example, the stream events may include or otherwise be associated with identifiers that specify the application or service to which the stream event is directed. Accordingly, in such configurations, the local user agent may determine whether the stream event corresponds to a particular application based on the identifier.

In step 615, if the local user agent determines that the stream event corresponds to the particular application, the local user agent may notify the remote user agent of the stream event. In one or more instances, application updates may include an update to the underlying application functionality or code or may be additional data that is to be provided to the user through the application (e.g., without modifying the underlying application functionality or code). In instances where the application functionality and/or code is updated by the stream event, a new content hash and/or a location identifier such as an application retrieval URI may be sent to the remote user agent. If, however, the update does not alter the underlying application, a new content hash or location identifier might not be transmitted to the remote user agent.

In step 620, the remote user agent may determine a stream event timeline from the notification received from the local user agent. The stream event timeline may define times at which various events are to occur. For example, the stream event timeline may indicate when a response to user interaction or notification message is to be provided to the user. The stream event timeline may also define an end time for the stream event. In step 625, the remote user agent may further determine whether the stream event start time has been reached. If not, the remote user agent may continue monitoring the time in step 630. If, however, the stream event time has been reached, the remote user agent may provide the event data to the user device in step 635. For example, if the event data includes a "Game Over" message, the event data may be used to generate a client compatible interface (e.g., HTML or JavaScript), which may then be transmitted to a presentation server for display on the user's interface.

Figure 7A:
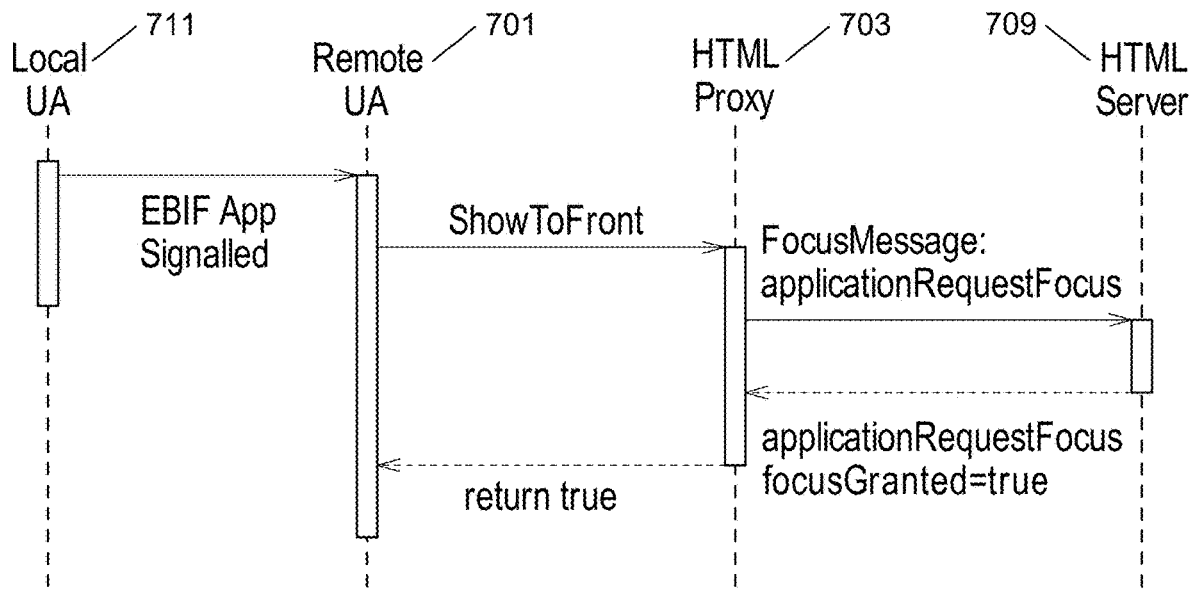
FIGS. 7A-7E illustrate example process and data flows for communication between a remote user and a server.

FIGS. 7A-7E illustrate example data flows for communications between a remote user agent device (e.g., remote user agent device 701) and a web-based application server such as HTML server 709. FIG. 7A, for instance, illustrates the process flow between the various devices in an interactive application delivery environment upon an interactive application being signaled (e.g., signaling indicating the start of an EBIF application or a status of an EBIF application changing). For example, when an EBIF application is signaled, if the remote user agent 701 does not have display focus on a client's device and interface, it may request focus from the HTML server 709. In one or more examples, HTML server 709 may correspond to a presentation or guide server configured to control an interface of the client's display or receiving device (not shown). Display focus may include, for example, an interface element having default input focus on the client device. Alternatively or additionally, display focus may include placing an interface or interface element in the foreground.

When the HTML server 709 receives the message that the remote user agent 701 wants focus it may choose whether to allow the remote user agent 701 to gain focus. HTML proxy server 703 may provide an intermediary device that is configured to handle requests, commands and interactions that might not need processing by the HTML server 709. For example, if user interaction corresponds to a request for an image, the image may be returned by the HTML Proxy server 703 (if stored therein) rather than having to request the image from the remote user agent device 701. HTML proxy server 703 may be designated to handle other processes and functions as required or desired by the remote user agent 701 or a content provider. In yet another example, HTML proxy server 703 may be configured to monitor for key or other user events independently of the remote user agent 701. According to one or more arrangements, the local user agent device (e.g., device 711) and the remote user agent device may correspond to a single or integral device.

Figure 7B:
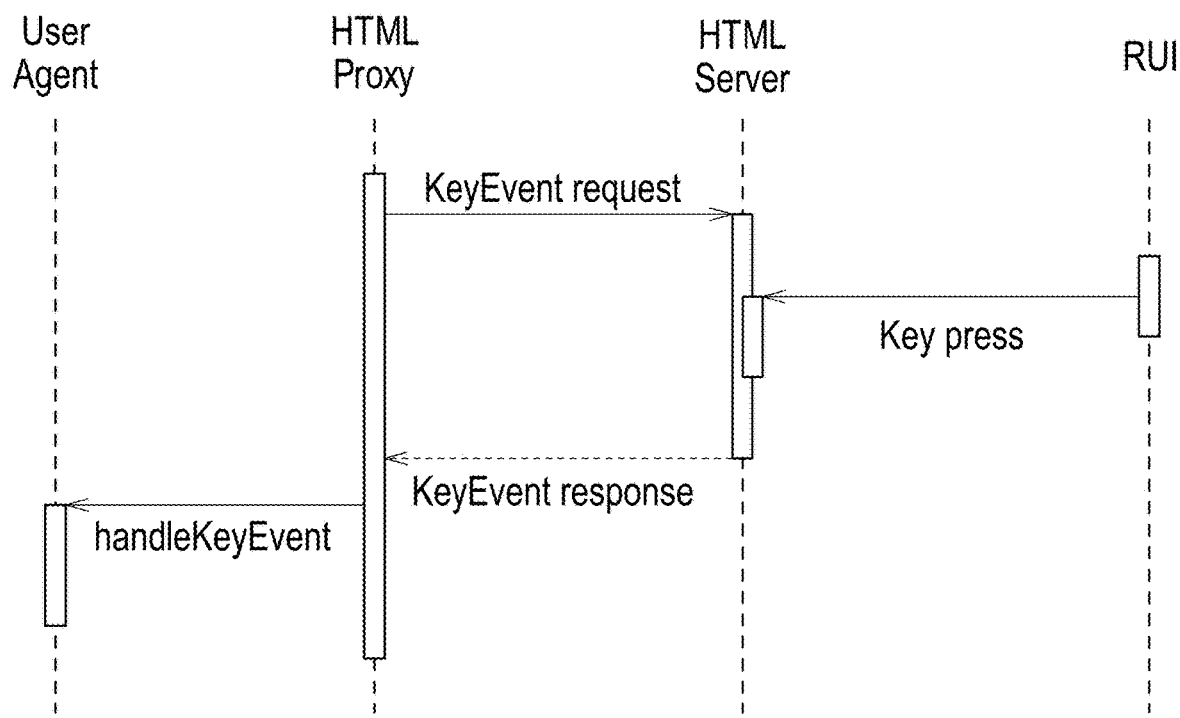

FIG. 7B illustrates an example key event data flow. The remote user agent may listen and monitor for user input key events through the HTML server by transmitting key event request messages periodically or aperiodically. For example, key events may occur at a remote user interface (RUI) such as a viewer's computer or display device and may be detected by the RUI and transmitted to the HTML server. The remote user agent may then process each key event upon receiving notification of the same. The remote user agent may, in some instances, choose not to consume a key event. For example, if the key event does not correspond to a predefined function or interaction with the application, the key event might not be processed.

Figure 7C:
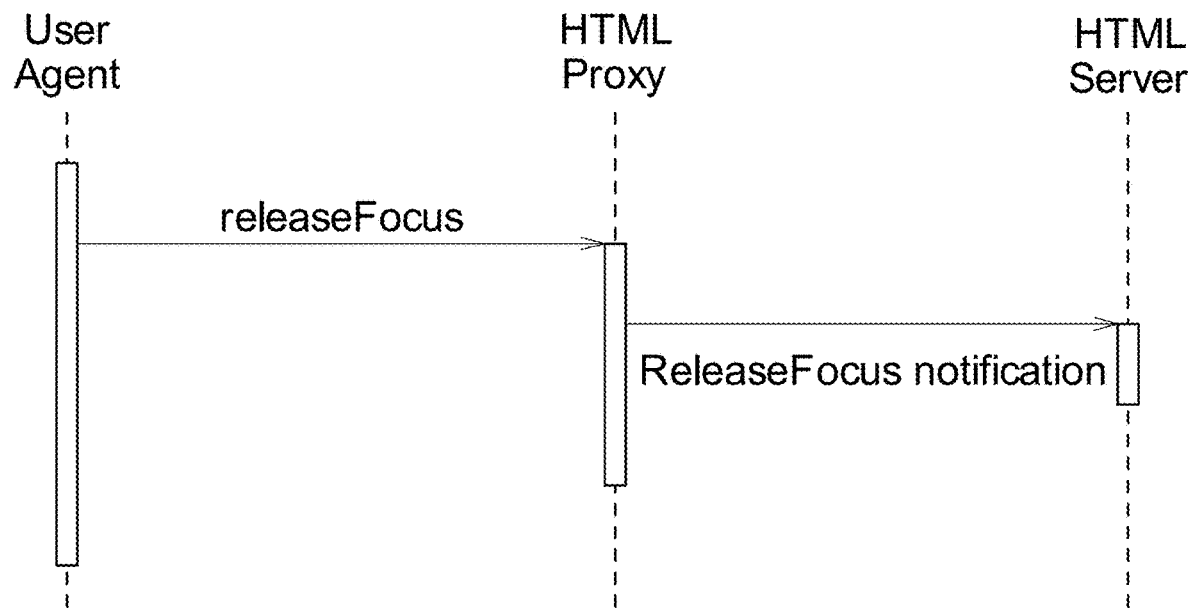

FIG. 7C illustrates an example data flow for releasing focus when focus is no longer needed for an EBIF application. For example, a release notification may be sent to the HTML application server upon receiving a corresponding command for an EBIF application.

Figure 7D:
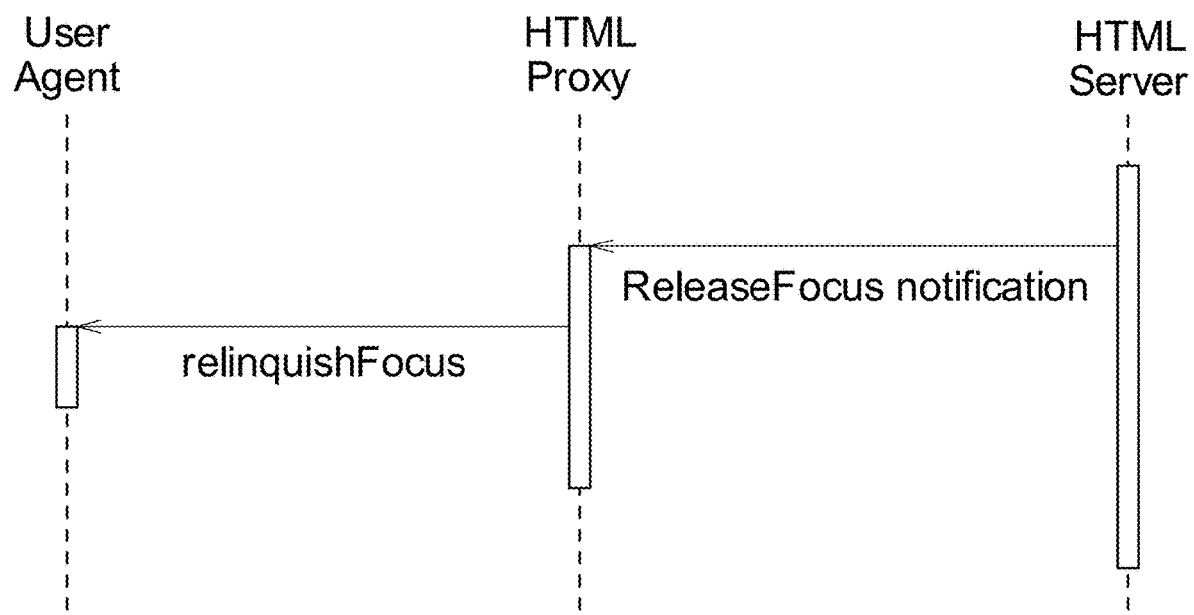

FIG. 7D illustrates an example data flow for releasing focus when the release originates from the client device or the HTML server. The HTML server may notify the user agent through the HTML proxy, for instance, of the release of focus. In some examples, the app server may need to retake focus for performing various other functions such as displaying guide information or advertisements for the client device and thus, may need to take focus away from the remote user agent.

Figure 7E:
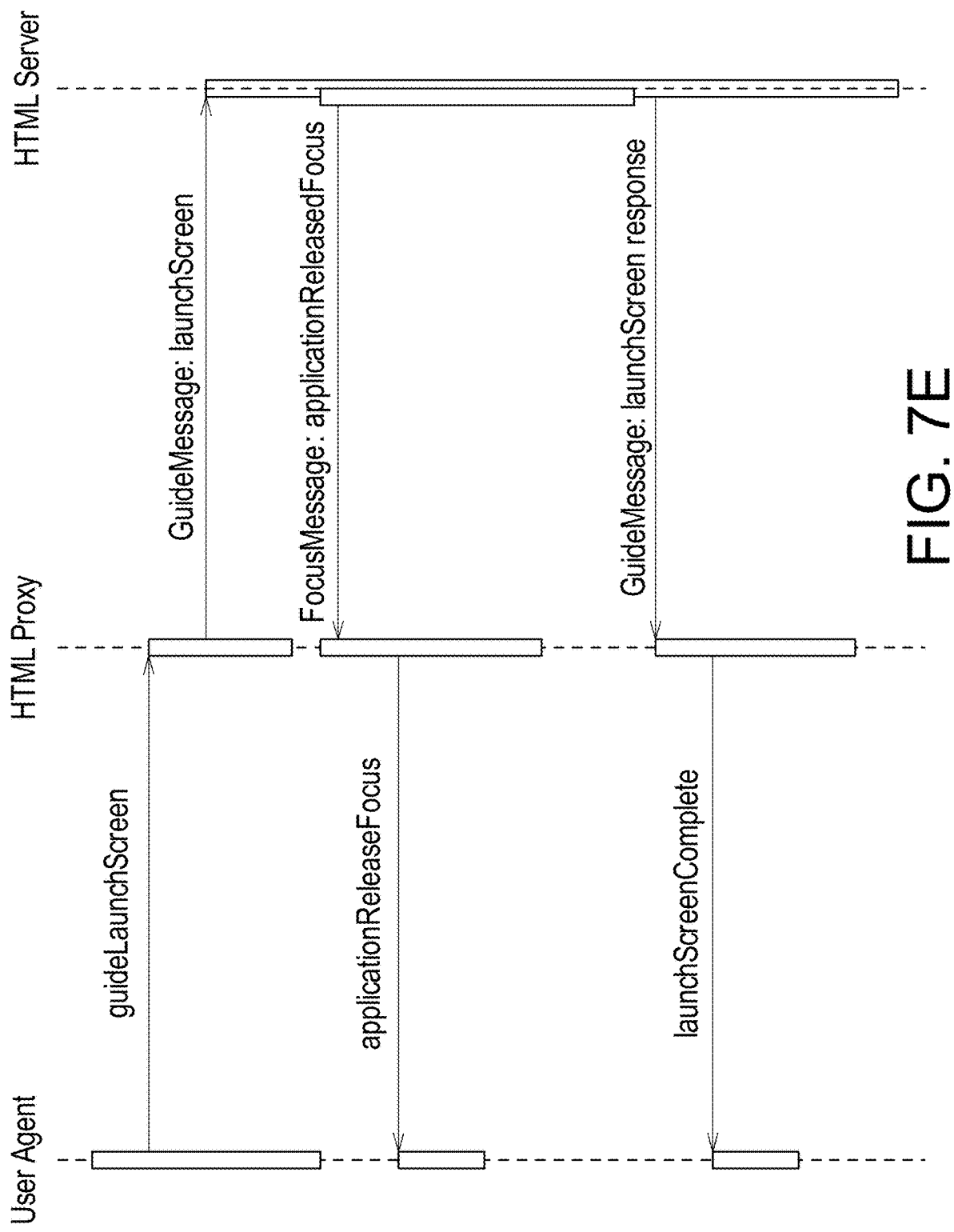

FIG. 7E illustrates an example data flow for providing a guide screen to the client device when an application is executing. Thus, when the HTML server determines that a guide screen or other interface or interface element other than the application needs to be launched or displayed, the HTML server may release focus from the application and notify the user agent. Once the guide screen display has been completed (e.g., the user is finished viewing the guide screen), focus may be returned to the application.

Figure 8:
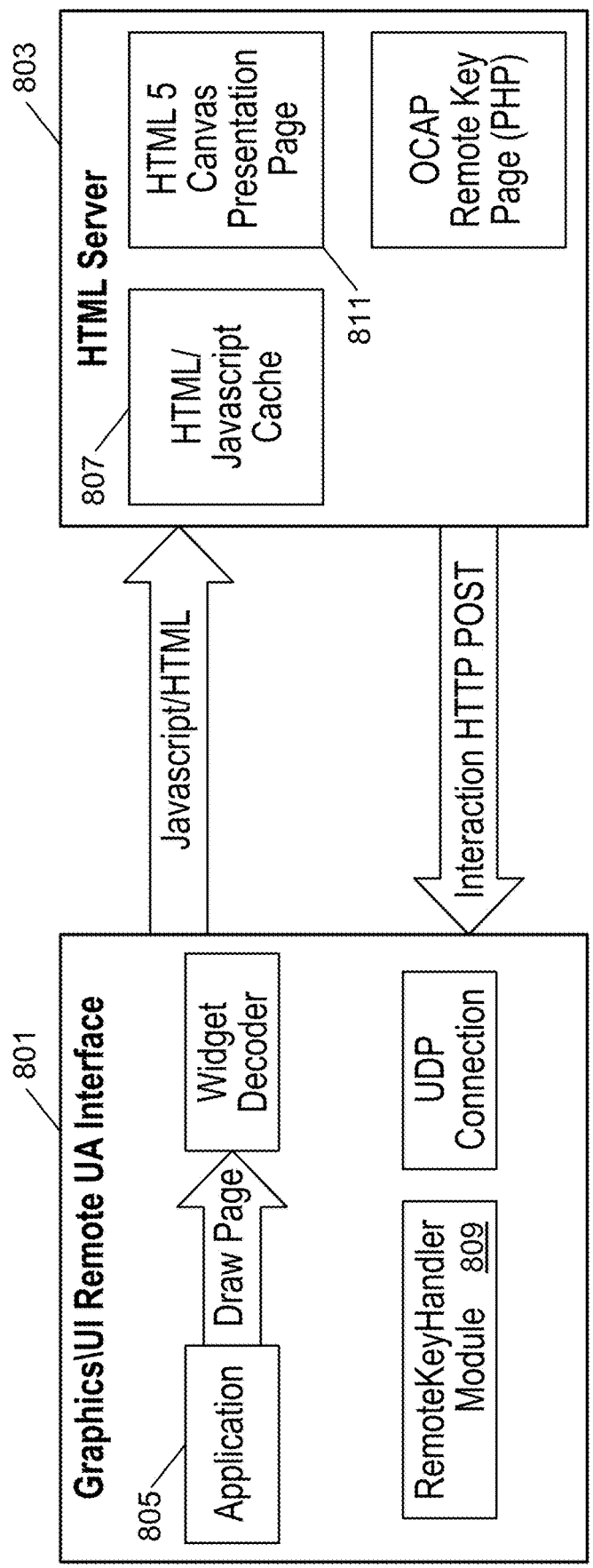
FIG. 8 illustrates an example architecture and process flow through which graphics or user interface elements may be communicated between a user agent and a client-compatible server.

FIG. 8 illustrates an example architecture through which graphics/user interface elements may be communicated between a remote user agent 801 and an HTML server 803. In the illustrated arrangement, the remote user agent 801 may provide an HTML rendering application 805 configured to create one or more HTML pages based on the current screens and/or visual elements of the EBIF application. The application may include multiple software and/or hardware modules for identification and retrieval of HTML widgets corresponding to the EBIF application elements. The generated web-compatible graphical user interface may then be transmitted to the HTML server 803. Various web-compatible languages may be used including JavaScript, HTML, XML and the like. The HTML server 803 may then store the data in a cache 807 for retrieval by a client device. Additionally or alternatively, the HTML server 803 may provide an HTML5 canvas presentation page 811 for displaying the generated page(s) to the client device. In one or more examples, the HTML server 803 may automatically deliver the generated page to a requesting client device (e.g., if the page is generated on-demand).

In some arrangements, when input (e.g., signal, keystroke, button press, etc.) is received through the HTML server 803 from a client device, the input is sent to the remote user agent 801 as an HTTP POST message. Alternative methods of notifying the remote user agent 801 of the user input may also be used. The remote user agent 801 may then interpret the input by identifying the EBIF element corresponding to the user interface element associated with the input and invoking the appropriate EBIF action or function based on the received input (e.g., determining the type of received input and invoking a corresponding EBIF function or action). In one example, such translation of input may be performed by a key handler module 809. The process may then repeat by re-generating the page and receiving additional signals, such as keypresses or other input. For example, if the EBIF application page changes in response to the input, the new page may be generated and delivered to HTML server 803 and the client device. The architecture of FIG. 8 may include elements for processing application output in a first non-client compatible format other than EBIF to a second client compatible format other than web-based formats.

Figure 9A:
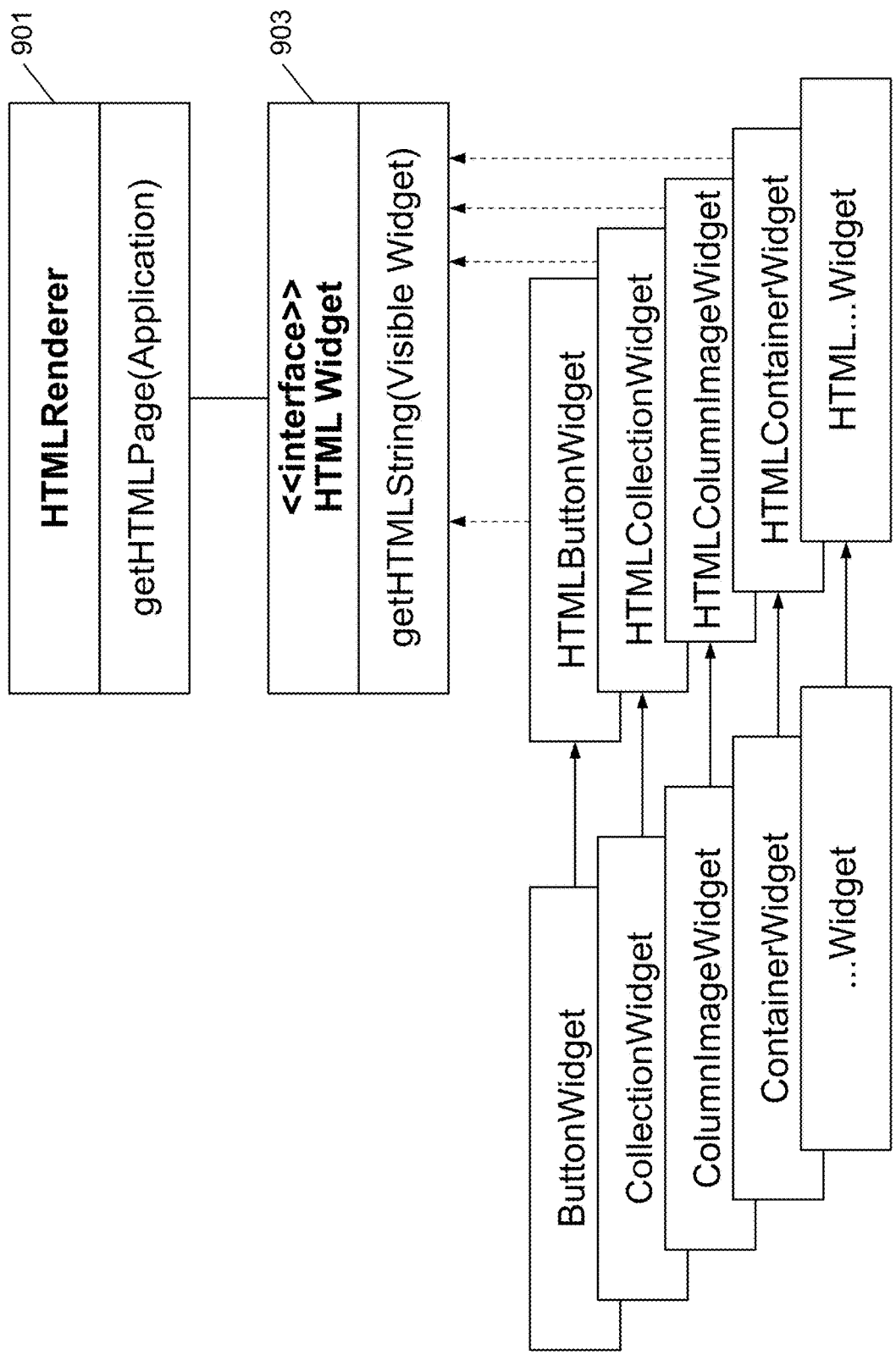
FIG. 9A illustrates an example web-based rendering module.

FIG. 9A illustrates an example HTML rendering module 901 that may be used to generate a web-compatible (e.g., Internet protocol-compatible) page for a web-compatible client device. HTML rendering module 901, for example, may reside in the remote user agent and be configured to traverse an EBIF application document object model (DOM). The application document (e.g., output) object model may define a logical structure of a document and the way a document is accessed and manipulated. In one example, the DOM may be defined in an XML format by converting the application output in EBIF format into an XML document object model using an XML schema as described herein. The HTML rendering module 901 may then generate HTML output as it traverses the application DOM. For example, for each user interface element encountered by the HTML rendering module 901 in the DOM, the rendering module 901 may generate or retrieve corresponding HTML code fragments.

In an example arrangement, rendering module 901 may further invoke an HTML widget module 903 that is configured to retrieve appropriate graphical widgets including containers, collections and buttons. Moreover, HTML output classes may be created that mirror each of the widgets used in EBIF applications. For example, to translate a button element in an EBIF application interface, the HTML rendering module 901 may call an HTMLButtonWidget output class to generate an HTML button. The output classes may also embed appropriate functionality (e.g., button selection events, text input events and the like). The embedded functionality may be HTML coded or JavaScript based or may use other web-compatible coding paradigms.

Figure 9B:
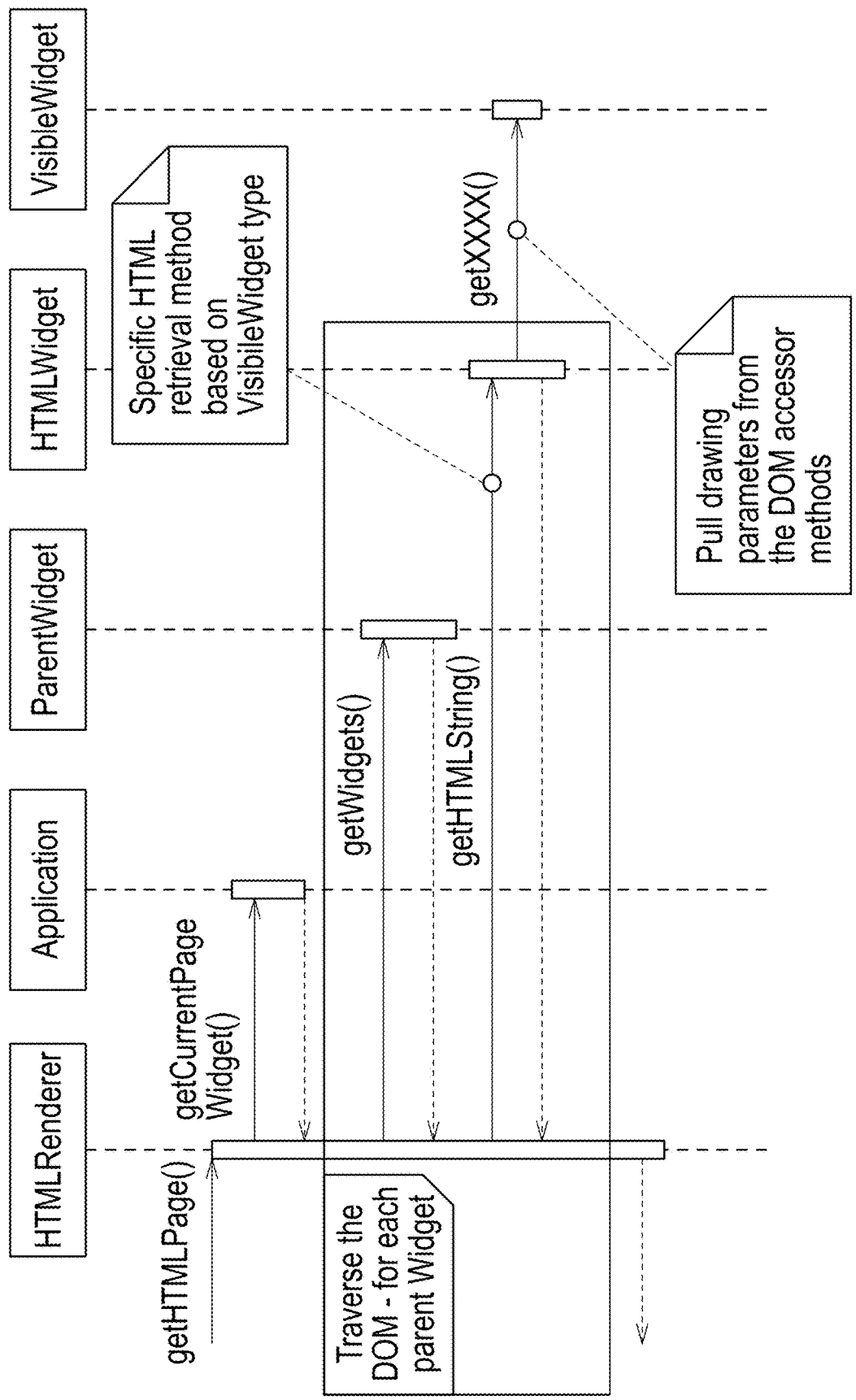
FIG. 9B illustrates an example process flow for generating a compatible interface.

FIG. 9B illustrates an example process flow by which an EBIF application DOM may be traversed (e.g., analyzed step-by-step or element-by-element) and a corresponding HTML page may be generated. Initially, the HTML rendered module (e.g., module 901 of FIG. 9A) may receive an HTML page request (e.g., getHTMLPage( ) invocation). The request may originate from a client device or may be generated by the remote user agent in response to receiving data for an EBIF application. In response to the request, the renderer may identify a first parent widget from the application by examining (e.g., parsing) the application's DOM. Subsequently, the renderer may identify each child widget existing within the first parent widget. For example, an application interface may have multiple sections defined by a table widget. Each table widget may then have various elements such as buttons, menus and the like. Accordingly, the table widget may be considered the parent widget while the buttons, menus and so forth may be considered child widgets since they exist within boundaries defined by the parent widget.

For each identified child widget, the renderer may obtain a corresponding HTML string or code that represents the child widget in web-compatible form. As noted herein, the renderer may retrieve such code using predefined HTML output classes or by associating HTML code to each of the EBIF application widgets that may potentially exist. The corresponding HTML string or code may then be added to an HTML page. The process may be repeated for each parent widget existing in the application DOM. Once all widgets have been processed in the above manner, the resulting HTML or other web-compatible page may be delivered to the requesting device (e.g., remote user agent, HTML server, web-compatible client device, etc.). Accordingly, in one example, the renderer may generate an HTML character stream which represents the visual state of the application at a given instant. In another example, images that exist within the application interface may be transmitted to the HTML application server and added into the HTML page (e.g., HTML or JavaScript stream). Adding the image to the HTML page may include defining a location of the image and invoking a rendering function to display the identified image at a specified location in the page.

Multiple types of widgets may be included in application output including visible widgets and non-visible widgets. Non-visible widgets may execute in a background and/or in the foreground without providing any visible output to the user. Visible widgets, on the other hand, may provide visible output to the user. Accordingly, as illustrated, only visible widgets may be processed into HTML output code in some arrangements. For example, corresponding HTML code might only be retrieved if a widget is determined to be visible or have visible output. Visible and/or non-visible widgets may be tagged or identified with a visible or non-visible flag, respectively. Accordingly, the system may determine whether a widget is visible or non-visible based on examining a corresponding flag or parameter. Additionally, according to one or more aspects, for each widget, the renderer may output a widget specific HTML header and a widget specific HTML footer. Widget headers and footer may be used to specify an order in which widgets are to be rendered or otherwise processed. Widget headers and footers may also indicate the existence of widgets within the HTML document as well as type and/or number thereof.

In an HTML5 arrangement, the rendering module may utilize the HTML5 graphical JavaScript library for visual representation of widgets. For example, the HTML5 Canvas and associated 2D Context JavaScript objects may be used to draw individual EBIF widgets using basic graphic primitives, such as line drawing operations, image blitting, and text rendering. The HTML5 canvas object provides an on-screen drawing surface that may be used by a remote user agent or rendering module to represent a virtual on-screen display (e.g., similar to existing set-top box's implementation of an OSD plane). In a particular example, the size of the canvas object may correspond to and represent the graphics screen resolution of the virtual EBIF application display in the web browser. HTML5 canvas objects may support basic graphical operations which will be used by the HTML Renderer to draw widget components, such as drawing and filling arcs, lines and rectangles. In HTML5, image objects can be declared once within an HTML page, and rendered to the canvas multiple times and in multiple locations, allowing the communication of image data to the UI device once throughout the lifetime of the EBIF application.

Alternatively or additionally, JavaScript libraries that may be used in generating and rendering web-compatible versions of EBIF widgets and interfaces may be downloaded to, stored and/or cached at the client device. For example, JavaScript functions for drawing specific shapes or creating specific interactive elements may be predefined and stored in the client device. In this arrangement, necessary JavaScript functions might not be downloaded every time an application requires those functions. Instead, those functions would already exist in the client device and may be invoked as needed without requiring additional network transmissions.

Figure 10D:
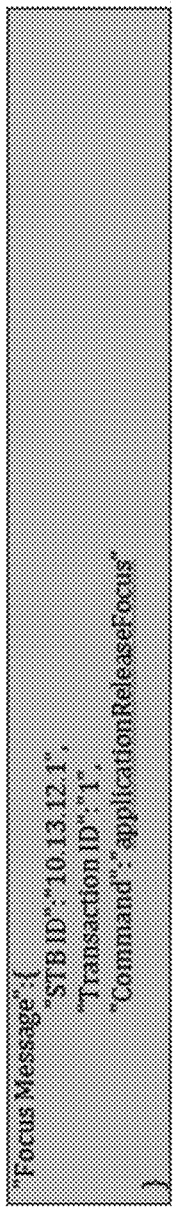

FIGS. 10A-G illustrate example messages used to communicate between the remote user agent and an HTTP application server. In FIG. 10A, for example, a message structure 1001 for transmitting image data from the remote user agent to the HTTP application server is defined. Structure 1001 includes an identifier for a corresponding content rendering device receiving the content streams and EBIF application streams from a network source. The message 1001 may further include a transaction identifier, identification of a type of graphics message and a corresponding command to be performed. The type of graphics messages may correspond to an HTML document or page or a resource type. A resource type may indicate an image, audio content, video and the like that may be carried within an HTML document or page or other client-compatible interface structure. Message 1001 further includes a payload section that stores the name of the image or other graphic and the image data.

FIG. 10B illustrates an example key event message. A key event message may be used to notify the remote user agent when an action is taken on the client device. For example, when a user presses a key, uses a scroll wheel or clicks a mouse button, these events may be registered by an event message sent to the remote user agent. The message structure 1011 may include a content rendering device identifier (e.g., an IP address or other network address), a transaction identifier and payload data comprising identification of the key pressed or action taken. Key events may correspond to ASCII codes that uniquely identify the corresponding key that was pressed or entered. In some examples, mouse events may be registered using a unique identifier along with coordinates of the location where the mouse click was detected. In yet other examples, touch events may be specified using a unique identifier along with location coordinates and/or other parameters including speed of the touch input (e.g., a swipe), an amount of pressure exerted and the like.

FIG. 10C illustrates an example request focus message when the remote user agent wishes to receive UI focus. The message structure may be similar to those of the key event and communication graphics data in that message 1021 also includes a content rendering device identifier, a transaction identifier and a command. In this case, the command may correspond to an "applicationRequestFocus" command. The payload may store a granted variable that specifies values that to be returned in response to the focus request. For example, the granted variable may include values such as null, true and false. Null may indicate that no action was taken because the application already has focus, while true and false indicate that focus was or was not granted to the application, respectively.

FIG. 10D illustrates an example message structure for a message to release focus.

Figure 10E:
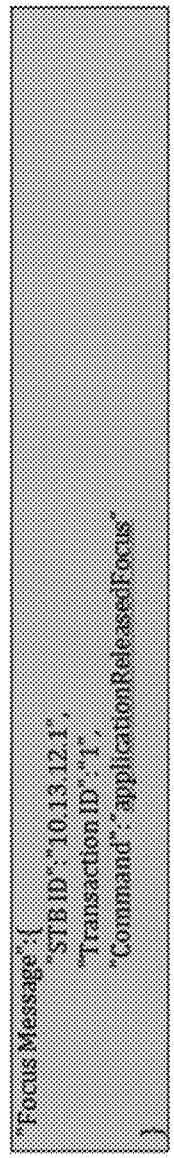

FIG. 10E illustrates an example message structure for a message indicating/confirming that focus has been released.

Figure 10F:
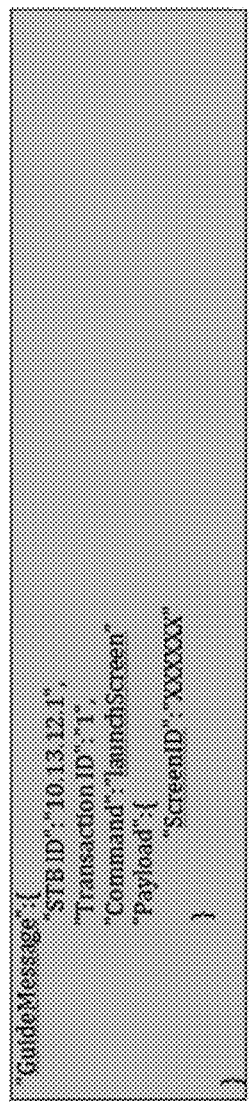

FIG. 10F illustrates an example guide screen launch message that may be sent from the remote user agent to the HTML application server to request that a particular guide screen be displayed. In the message, the payload includes a ScreenID variable that identifies the particular guide screen that is to be displayed at the client device.

FIG. 10G illustrates an example media locator message structure for defining a message to retrieve a media locator associated with given content source identifier type such as virtual channel number, call letters and network ID. Additionally or alternatively, the source identifier type may also include a source ID, which may be configured to identify content sources or providers by a URI. The media locator parameter specifies the address or location of desired content or of a content source. The data field may be used to store the content source name or other identifier corresponding to the identifier type specified. For example, if the type specifies call letters, the data field may store "WTTG" to identify the FOX local affiliate (e.g., a content source such as a television station) in Washington, D.C. In another example, if the identifier type specifies network ID, the data parameter may store "NBC," corresponding to the NBC network. A network may include a group of different channels, content stations or other types of content sources. In one example, a network may map to multiple call letters if the network provides different content sources or stations in different content markets or locations. Virtual channel number may also be used to identify a content source and may be assigned to a content source by an administrative organization, selected by the content providers or the like.

The media locator field may be left unpopulated in the request message. A system responding to the media locator query may then populate the media locator field with the requested information. For example, the response system may populate the media locator field with a URI or other network location identifier for the specified call letters, virtual channel number, network identifier and/or source identifier.

FIG. 11 illustrates an interactive application configuration interface in which a user may choose to receive ETV applications on a display such as a television display or, additionally or alternatively, on a separate computing device such as PC 118a (FIG. 1). Interface 1101 may be accessed by navigating a user agent such as web browser 1100 to a predefined network address associated with the application converter system. In one example, the user may navigate to the IP address of the set top box of a cable network system.

Interface 1101 may include a program listing 1103, where each program 1105 or channel 1107 may include an indicator that allows a user to configure applications for that program or channel, respectively. Configuration panel 1109 allows a user to select whether to receive application data on the television, display or computing device (option 1111), other device (option 1113) or both (option 1115). If either option 1113 or 1115 is selected, a list 1117 of detected network devices may be provided to allow a user to choose a desired receiving device. Alternatively or additionally, a user may specify a network address of a receiving device (e.g., IP address, telephone number for cell phones, etc.). Interface 1101 may further include a selection box 1119 that allows a user to modify or define the configuration settings for all channels and programs. Accordingly, application data may be transmitted to the configured device for all channels and programs. In one or more arrangements, application data for only a currently displayed program or channel might be delivered to a designated device.

Enhanced television applications viewing preferences need not be predefined. Instead, the applications may be provided to a user's device upon the device accessing a specified site or address through a user agent such as a web browser. For example, if a user is watching television and sees that an interactive television application is available, the user may logon to a specified website to receive and interact with the application.

Figure 12:
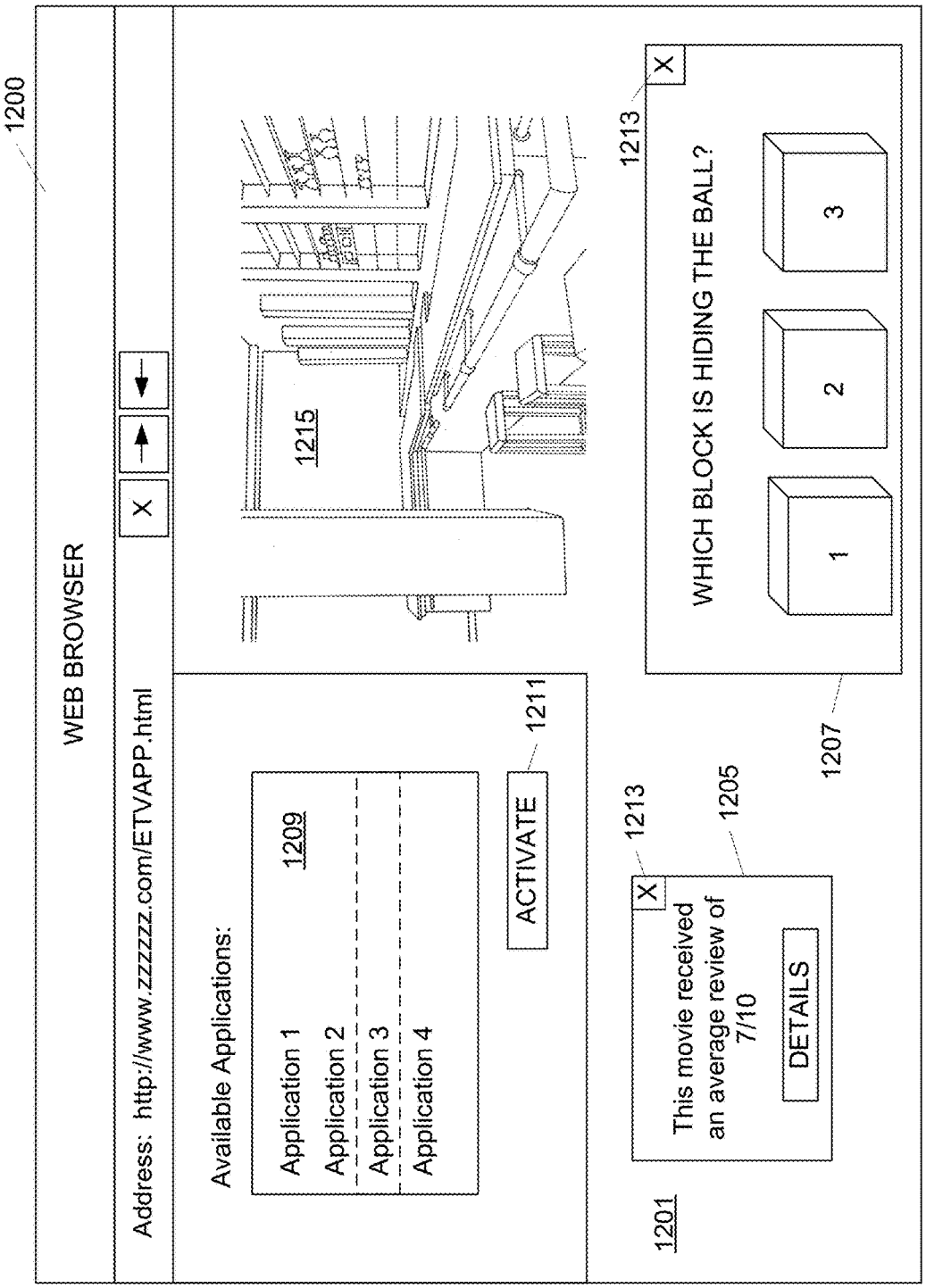
FIG. 12 illustrates an example interface in which interactive applications may be presented.

FIG. 12 illustrates a user agent web browser in which an application is displayed and executed. To access an interactive application, a user may navigate to a predefined address (e.g., an IP address of conversion system such as a remote user agent device) with a user agent such as web browser 1200. An interface 1201 may be provided in browser 1200, allowing a user to receive application data over a network connection (e.g., discontinuous or streaming). Interactions and commands may then be sent back to the remote user agent device and a service provider through the same network connection. Interface 1201 may include one or more ETV applications 1203 including a movie review widget 1205 and an interactive game 1207. Users may select other ETV applications from a list 1209 of interactive applications currently available and activate the selected application using option 1211. Availability may be determined by currently available programming or programming currently being transmitted. Upon activation, an application may be placed into interface 1201. If insufficient space exists for adding the application, the user may be notified of such. Applications such as applications 1203 may be turned off or closed by selecting close option 1213. According to one or more arrangements, interface 1201 may further include a display of currently selected programming 1215.

While some aspects described herein relate to the conversion of application output, EBIF applications and data may be converted or exchanged as a whole into a client compatible format. For example, a client compatible version of the application data may be pre-stored in a database and retrieved (e.g., by the remote user agent) for a client device when necessary. Data for an application, regardless of format, may include an identifier assigned to the application. Accordingly, the web compatible data may be retrieved using an application identifier extracted from the EBIF data or a transmission stream carrying the EBIF data. Alternatively or additionally, the remote user agent may determine whether the client device is compatible with the initial application format and, if not, retrieve a client compatible version. Multiple versions of the application may be provided in multiple different formats. If a client compatible version is not available, the user agent may process the application using the output conversion aspects described herein.

The methods and features recited herein may further be implemented through any number of computer readable media (e.g., memory) that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (IC s). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

The invention claimed is:

1. A method comprising:
receiving, by a computing device, first data in a first format, wherein the first data is associated with an interactive application;
determining, based on the first data, second data in a second format;
generating, based on the second data, an interface;
selecting, from a plurality of functions of the interactive application and based on a location of user input within the interface, a function of the interactive application; and
sending third data, in the first format, that is configured to cause the selected function of the interactive application to be executed.

2. The method of claim 1, wherein the interactive application comprises a multi-user interactive application configured to receive input from multiple devices.

3. The method of claim 1, further comprising:
receiving, after the selected function is executed, fourth data in the first format;
determining, based on the fourth data, fifth data in the second format; and
generating, based on the fifth data, a second interface.

4. The method of claim 1, wherein:
the first format comprises Enhanced Binary Interchange Format (EBIF); and
the second format comprises Extensible Markup Language (XML) or Hypertext Markup Language (HTML).

5. The method of claim 1, wherein the third data comprises a command.

6. The method of claim 1, wherein the selecting the function comprises selecting the function further based on a type of the user input.

7. The method of claim 1, further comprising:
sending, to a first device, video content associated with the interactive application;
receiving, from the first device and after initiating the sending the video content, a request for the interactive application; and
receiving, from the first device, the user input.

8. An apparatus comprising:
one or more processors; and
memory storing instructions that, when executed by the one or more processors, configure the apparatus to:
receive first data in a first format, wherein the first data is associated with an interactive application;
determine, based on the first data, second data in a second format;
generate, based on the second data, an interface;
select, from a plurality of functions of the interactive application and based on a location of user input within the interface, a function of the interactive application; and
send third data, in the first format, that is configured to cause the selected function of the interactive application to be executed.

9. The apparatus of claim 8, wherein the interactive application comprises a multi-user interactive application configured to receive input from multiple devices.

10. The apparatus of claim 8, wherein the instructions, when executed by the one or more processors, configure the apparatus to:
receive, after the selected function is executed, fourth data in the first format;
determine, based on the fourth data, fifth data in the second format; and
generate, based on the fifth data, a second interface.

11. The apparatus of claim 8, wherein:
the first format comprises Enhanced Binary Interchange Format (EBIF); and
the second format comprises Extensible Markup Language (XML) or Hypertext Markup Language (HTML).

12. The apparatus of claim 8, wherein the third data comprises a command.

13. The apparatus of claim 8, wherein the instructions, when executed by the one or more processors, configure the apparatus to select the function further based on a type of the user input.

14. The apparatus of claim 8, wherein the instructions, when executed by the one or more processors, configure the apparatus to:
   send, to a first device, video content associated with the interactive application;
   receive, from the first device and after initiating sending the video content, a request for the interactive application; and
   receive, from the first device, the user input.

15. One or more non-transitory computer-readable media storing instructions that, when executed, cause:
   receiving first data in a first format, wherein the first data is associated with an interactive application;
   determining, based on the first data, second data in a second format;
   generating, based on the second data, an interface;
   selecting, from a plurality of functions of the interactive application and based on a location of user input within the interface, a function of the interactive application; and
   sending third data, in the first format, that is configured to cause the selected function of the interactive application to be executed.

16. The one or more non-transitory computer-readable media of claim 15, wherein the interactive application comprises a multi-user interactive application configured to receive input from multiple devices.

17. The one or more non-transitory computer-readable media of claim 15, wherein:
   the first format comprises Enhanced Binary Interchange Format (EBIF); and
   the second format comprises Extensible Markup Language (XML) or Hypertext Markup Language (HTML).

18. The one or more non-transitory computer-readable media of claim 15, wherein the third data comprises a command.

19. The one or more non-transitory computer-readable media of claim 15, wherein the instructions, when executed, cause the selecting the function further based on a type of the user input.

20. The one or more non-transitory computer-readable media of claim 15, wherein the instructions, when executed, further cause:
   sending, to a first device, video content associated with the interactive application;
   receiving, from the first device and after initiating the sending the video content, a request for the interactive application; and
   receiving, from the first device, the user input.

\* \* \* \* \*

UNITED STATES PATENT AND TRADEMARK OFFICE
CERTIFICATE OF CORRECTION

| | |
|---|---|
| PATENT NO. | : 11,875,140 B2 |
| APPLICATION NO. | : 17/852074 |
| DATED | : January 16, 2024 |
| INVENTOR(S) | : de Andrade et al. |

Page 1 of 1

It is certified that error appears in the above-identified patent and that said Letters Patent is hereby corrected as shown below:

On the Title Page

Page 2, Column 1, Item (56), Other Publications Line 1:
Delete "104," and insert --I04,--

In the Specification

Column 5, Lines 47-48:
Delete "http://www.opencable.com/downloads/specs/OC-SP-ETV-BIF1.0-104-070921.pdf." and insert --http://www.opencable.com/downloads/specs/OC-SP-ETV-BIF1.0-I04-070921.pdf.--

Column 17, Line 34:
Delete "(IC s)." and insert --(ICs).--

Signed and Sealed this
Third Day of December, 2024

Katherine Kelly Vidal
*Director of the United States Patent and Trademark Office*